F. J. PORTER.
SOUND PRODUCER.
APPLICATION FILED SEPT. 1, 1916.

1,238,566.

Patented Aug. 28, 1917.
3 SHEETS—SHEET 1.

Inventor
Fred J. Porter.
By Victor J. Evans
Attorney

F. J. PORTER.
SOUND PRODUCER.
APPLICATION FILED SEPT. 1, 1916.
1,238,566.
Patented Aug. 28, 1917.
3 SHEETS—SHEET 2.
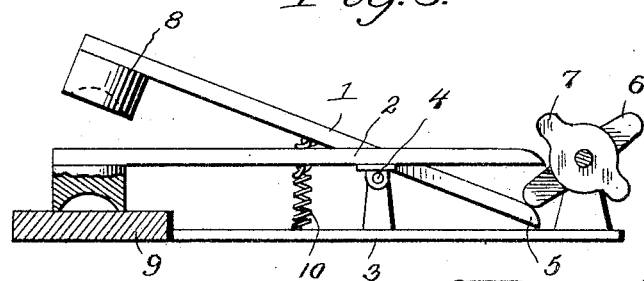
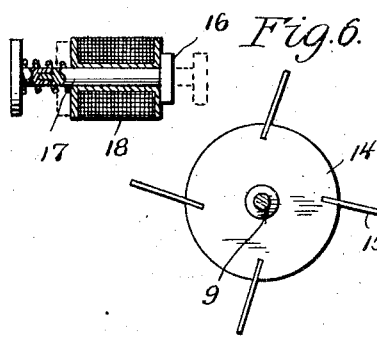
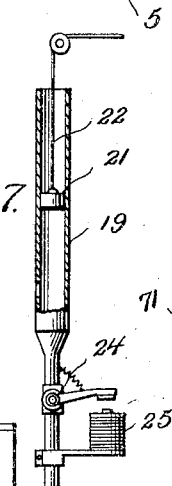
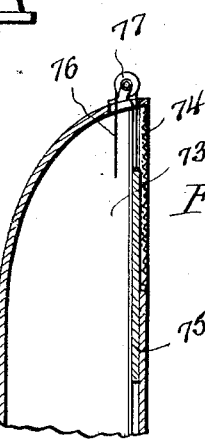
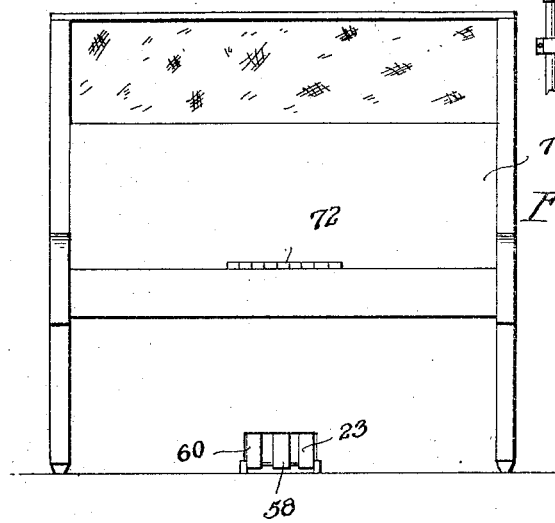
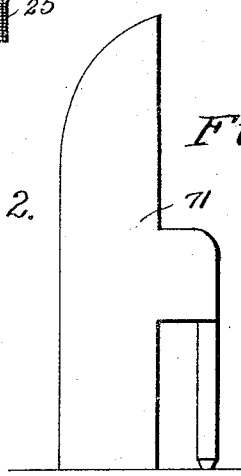
Inventor
Fred J. Porter
By Victor J. Evans
Attorneys F. J. PORTER.
SOUND PRODUCER.
APPLICATION FILED SEPT. 1, 1916.
1,238,566.
Patented Aug. 28, 1917.
3 SHEETS—SHEET 3.
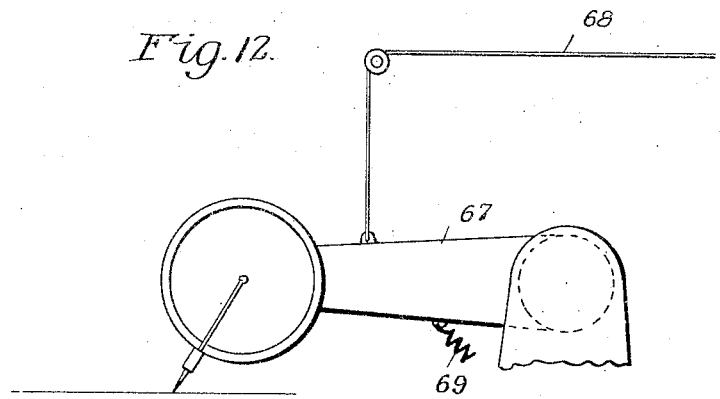
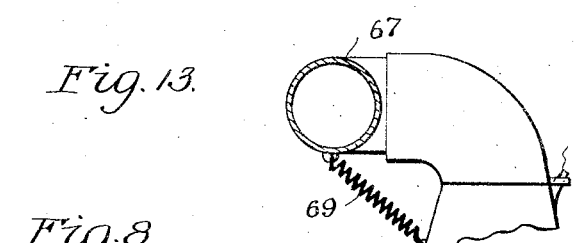
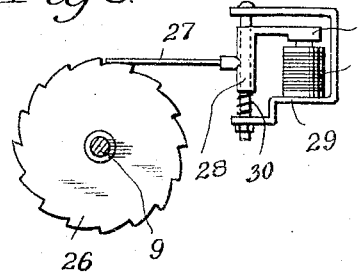
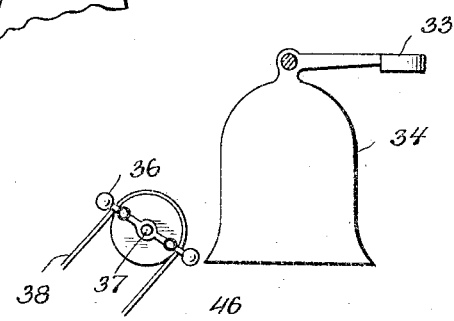
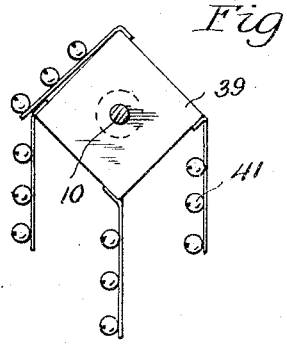
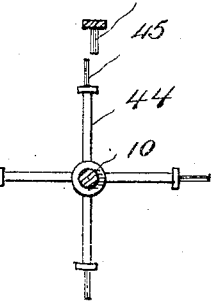
Inventor
Fred J. Porter
By Victor J. Evans
Attorney

UNITED STATES PATENT OFFICE.

FRED J. PORTER, OF COLUMBUS, OHIO.

SOUND-PRODUCER.

1,238,566.

Specification of Letters Patent.

Patented Aug. 28, 1917.

Application filed September 1, 1916. Serial No. 118,127.

*To all whom it may concern:*

Be it known that I, FRED J. PORTER, a citizen of the United States, residing at Columbus, in the county of Franklin and State of Ohio, have invented new and useful Improvements in Sound-Producers, of which the following is a specification.

In the moving picture art it is often necessary to produce sound in synchronism with the projection of pictures upon the screen.

The primary object of this invention is to accomplish the foregoing result in a manner as to only require one operator.

An object of the invention is the novel manner of associating the sound producing devices with the constantly driven shafts and using an electromechanical means for selectively setting into operation any one of the devices.

Briefly stated my invention consists of a device having a roughened surface coöperating with a movable element for imitating rushing water, water falls, or wind blowing; a device carrying wire brushes for imitating railroad trains or automobiles; a device comprising a ratchet wheel and a movable spring strip for imitating the breaking of boards or the falling of a ceiling; a device consisting of a metallic drum supporting broken material for imitating the breaking of dishes or windows; a bell moving about a pivot so as to be acted upon by a constantly driven hammer; a disk supporting a flexible element adapted to engage a movable independent element for imitating a motor boat, aeroplane, or motor cycle; a device constructed to imitate the trotting of a horse; a miniature door connected so as to be manually closed from a remote point; a talking machine constructed to have the reproducer manually thrown into engagement with the record; a whistle having an adjustable piston for varying the tone qualities; a resilient strip arranged to be tensioned and then liberated for imitating the dropping of an article; sleigh bells arranged to be given rotary motion by one of the constantly driven shafts.

The invention will be better understood from the following detail description taken in connection with the accompanying drawings wherein:—

Fig. 2, is a front elevation of a cabinet which will contain the sound devices.

Fig. 3, is a side elevation thereof.

Fig. 4, is a detail view of a modification.

Fig. 5, is a side elevation of a device for imitating the trotting of a horse.

Fig. 6, is a detail view of a device for imitating the sound of an aeroplane.

Fig. 7, is a detail view of a whistle.

Fig. 8, is a detail view of a device to imitate the sound of a falling ceiling.

Fig. 9, is a detail view of the bell.

Fig. 10, is a detail view of a device for imitating sleigh bells.

Fig. 11, is a detail view of a device for imitating a train.

Figs. 12 and 13 are detail views of a portion of a talking machine.

Figure 1:
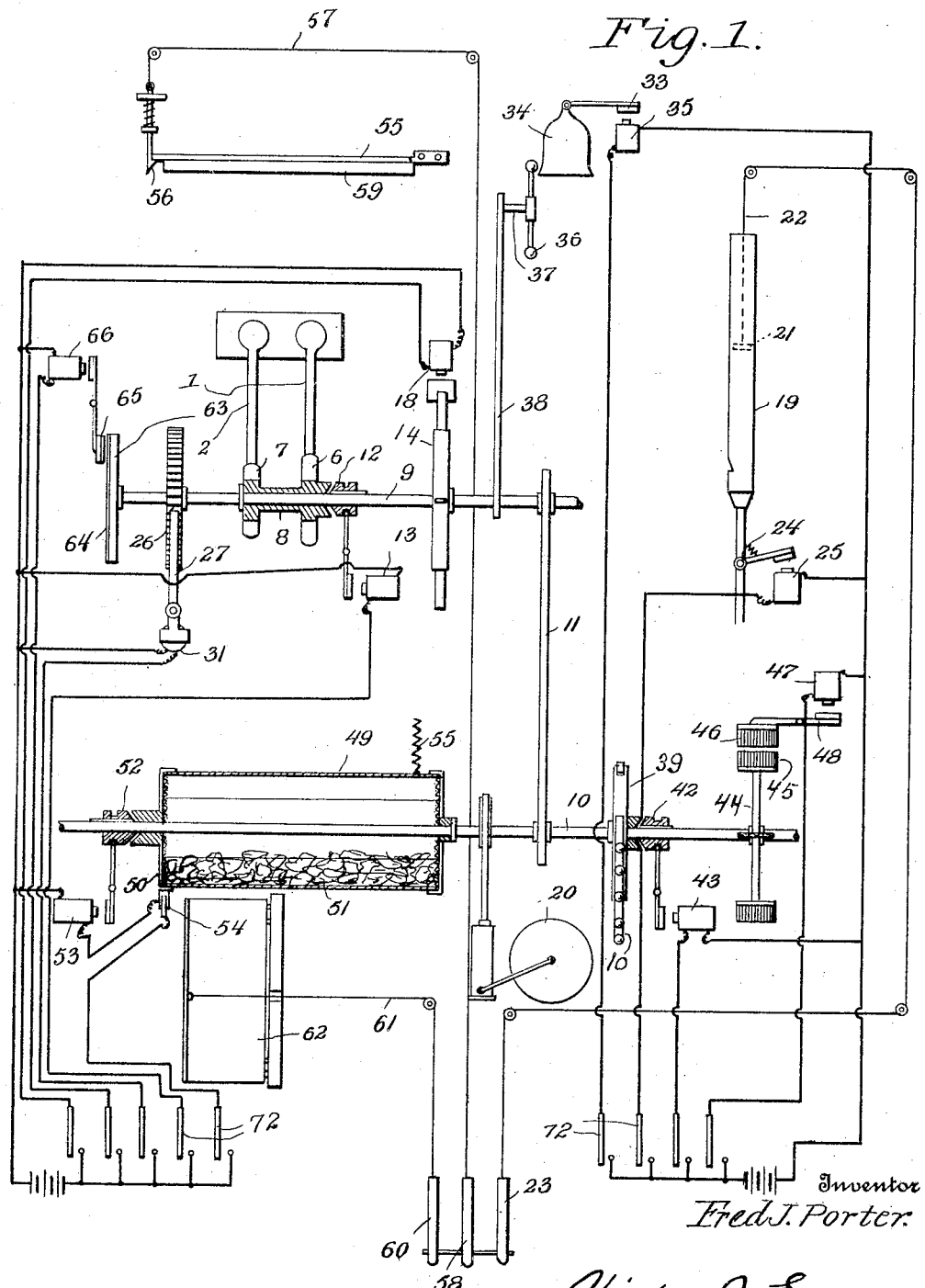
Figure 1, is a diagrammatic view of the system.

I will first describe the different sound producing devices and then how the devices may be selectively operated by associating and closing the electrical circuits.

The device for imitating the trotting of a horse consists of a pair of arms 1 and 2 pivotally supported on a base 3 as indicated at 4. One end of the arm 1, is beveled as indicated at 5, so as to coöperate with a cam 6, while one end of the arm 2 is similarly shaped so as to coöperate with the second cam 7. At this point I wish to call attention to the fact that the cams are different sizes so as to give different movement to the arms for the purpose of allowing the arms to create sounds of different volume as the sound of the rear hoof of a horse is different from that made by the front hoof. The remaining ends of the arms carry cups 8 adapted to strike a table 9 through the section of the spring 10. As clearly shown in Fig. 1 of the drawing the cams 6 and 7 are connected together by a sleeve 8 that is in turn loosely mounted on an auxiliary shaft 9 that has connection with the main shaft 10 by the belt 11. The sleeve 8 is rigidly connected to the shaft 9 by a clutch that is operated when the magnet 13 is energized.

The device for imitating the sound of an aeroplane consists of a disk 14 loosely mounted on the shaft 9. In the periphery of the disk at spaced points are flexible strips 15. In the path of movement of the strip 15 is a block 16 carried upon the core 17 of the solenoid 18. From this arrangement it will be seen that in the rotation of the disk 14 the strips 15 will successively strike the block 16 when the latter has been moved by the solenoid 18 being energized. A whistle 19 receives its air from a tank 20 by suitable piping shown broken away for clearness, and this whistle is provided with a plunger 21 given movement by a flexible element 22 manually operated by a foot treadle 23. The flow of air from the tank 20 through the whistle is controlled by a valve 24 operated by a magnet 25.

In Fig. 8 the device for imitating the falling of a ceiling consists of a ratchet wheel 26 rigidly secured to the shaft 9 and coöperating with a resilient strip 27 carried upon a sleeve 28 that is in turn slidably supported in a bracket 29. The strip 27 is held out of engagement with the ratchet wheel by a spring 30 acting on the sleeve 28. The strip is moved into engagement with the ratchet against the action of the spring by the influence of a magnet 31 attracting an armature 32 formed upon the sleeve 28.

In Fig. 9, I have shown an armature 33 rigidly secured to a bell 34 at its point of suspension so that when the armature 33 is attracted by a magnet 35 a portion of the bell will be disposed in the path of movement of the constantly rotated hammers 36 carried upon the counter shaft 37 that is in turn driven from the shaft 9 by the belt 38.

In Fig. 10 I have shown a rectangular plate 39 secured to a main shaft 10 that in turn may be driven in any suitable manner. To the corners of this plate I secure the usual sleigh bells 41. Coöperating with the plate 39 is a clutch 42 keyed upon the shaft 10 and operated by a magnet 43.

In Fig. 11 I have shown a device for imitating the sound of a railway train and as shown consists of a bracket 44 rigidly secured to the shaft 10 and this bracket 44 carries wire brushes 45 adapted to successfully strike another brush 46 when the latter is moved in the path of movement of the brushes 45, upon the action of the magnet 47 that acts upon an armature 48 supporting the brush 46. Also loosely mounted on the shafts 10 is a casing 49 having its ends covered by wire mesh 50. Within this casing is a quantity of broken material. This casing is connected to the shaft by a clutch 52 operated by a magnet 53. At this point I wish to call attention to the fact that a switch 54 is arranged in the circuit of the magnet 53 which is arranged to be operated when the casing 49 is given a partial rotation and when this action takes place a coil spring 45 returns the casing to its normal position.

The device for imitating the breaking of a board or similar action consists of a strip 55 having one end rigidly supported while its remaining end is engaged by a spring pressed catch 56 that is in turn operated by a flexible element 57 which terminates in the foot treadle 58. When the strip 59 is given the proper tension it slips off the catch 56 and violently strikes the table or support 59. A third foot treadle 60 has a flexible connection 61 with a miniature door 62 so that when the treadle 66 is depressed the door will be drawn into engagement with a stationary support for the door.

To complete my invention I secure to one end of the shaft 9 a disk 63 one face of which being roughened or carries a piece of sand paper 64 adapted to engage the block 65 also carrying a strip of sand paper when the latter is given movement by the magnet 66. If found advantageous in practice a talking machine may be used and to allow the machine to be operated from a remote point I connect to the tone arm 67 of the machine a flexible element 68 that may be connected to a treadle similar to those illustrated in Fig. 1. A spring 69 is arranged at such an angle as to move the needle of the reproducer into engagement with the first sound line of the record as clearly shown in Fig. 13. To insure this operation I provide a stop 70 which limits the lateral movement of the tone arm 67.

In Figs. 2 to 4 inclusive of the drawings I have illustrated one form of cabinet that may be constructed to house the devices and in this particular instance consists of a casing 71 having the general outline of a piano with the keys thereof constructed in the form of circuit closers 72, whereby the circuits of the magnets may be selectively closed. The interior of the casing is formed into an intensifying passage 73 the exit of which is closed by a porous material 74 such as a piece of cloth. Slidably mounted in the casing is a gate 75 adapted to obstruct all or a portion of the sound passage 73 so as to give the impression of distance. The gate 75 is operated in any suitable manner such as by a flexible element 76 passing around a pulley 77.

It is to be understood that while all of the several features of my improved apparatus have special coöperations with one another and together constitute a particular effective mechanism for the purpose in view certain of these features may be applied in other relation and I therefore desire to cover the combination present in the several parts of my improved apparatus whether employed in the general organization shown or elsewhere.

It is further understood that the structural embodiment of the invention as a whole and its various features as shown is merely illustrative and not restrictive as I am well aware that many of the details of construction may be widely varied without departing from the spirit of the invention, I therefore desire not to be limited to these particulars or any other except as set forth in the appended claims.

What I claim is:—

1. A sound producer comprising a main shaft, an auxiliary shaft having a connection with said main shaft, sound generating devices loosely mounted on said shafts and means for accomplishing a rigid connection between said devices and the shafts.

2. A sound producer comprising a main shaft, an auxiliary shaft having a connection with said main shaft, sound generating devices mounted for rotation upon said shaft and electromechanical means for selectively connecting said devices in a rigid manner to said shafts.

3. An apparatus of the class described comprising in combination a main shaft, a casing loosely mounted thereon containing a quantity of broken material, an electrical control clutch for rigidly connecting the casing to said shaft, an auxiliary shaft having connection with said main shaft, a pair of cams loosely mounted on said auxiliary shaft, an electrical control clutch for rigidly connecting the cams to the said auxiliary shaft and a pair of arms given movement by said cams and adapted to strike a suitable support for the purposes set forth.

4. An apparatus of the class described comprising in combination a main shaft, a casing loosely mounted thereon containing a quantity of broken material, an electrical control clutch for rigidly connecting the casing to said shaft, an auxiliary shaft having connection with said main shaft, a pair of cams loosely mounted on said auxiliary shaft, an electrical control clutch for rigidly connecting the cams to the said auxiliary shaft, a pair of arms given movement by said cams and adapted to strike a suitable support for the purposes set forth, a disk rigidly secured to said auxiliary shaft having one of its faces roughened, and electrical mechanical means including a block arranged to be thrown into engagement with the roughened face of said disk.

5. An apparatus of the class described comprising in combination a main shaft, a casing loosely mounted thereon containing a quantity of broken material, an electrical control clutch for rigidly connecting the casing to said shaft, an auxiliary shaft having connection with said main shaft, a pair of cams loosely mounted on said auxiliary shaft, an electrical control clutch for rigidly connecting the cams to the said auxiliary shaft, a pair of arms given movement by said cams and adapted to strike a suitable support for the purposes set forth, a disk rigidly secured to said auxiliary shaft having one of its faces roughened, electrical mechanical means including a block arranged to be thrown into engagement with the roughened face of said disk, other disks rigidly secured to the auxiliary shaft formed with projections and an electrical mechanical means for disposing an element in the path of movement of the projections.

6. An apparatus of the class described, comprising in combination a main shaft, a casing loosely mounted thereon containing a quantity of broken material, an electrical control clutch for rigidly connecting the casing to said shaft, an auxiliary shaft having connection with said main shaft, cams loosely mounted on the auxiliary shaft, an electrical control clutch for rigidly connecting the cams to the said auxiliary shaft, a pair of arms given movement by said cams adapted to strike a suitable support for the purposes set forth, a disk rigidly secured to said auxiliary shaft having one of its faces roughened, an electrical mechanical means including a block arranged to be thrown into engagement with the roughened face of said disk, other disks rigidly secured to the auxiliary shaft formed with projections, electrical mechanical means for disposing an element in the path of movement of the projections, electrical circuits for all of said electromechanical means and a circuit closer for each circuit.

7. An apparatus of the class described comprising in combination a plurality of shafts having connections with each other, a plurality of sound generating devices loosely mounted on the shafts, electromagnets for rigidly connecting the devices to the shafts an electrical circuit for each magnet, a talking machine the tone arm of which having a connection with a flexible element manually operated and a spring so arranged as to bring about engagement between the reproducer and the record.

In testimony whereof I affix my signature.

FRED J. PORTER.

Copies of this patent may be obtained for five cents each, by addressing the "Commissioner of Patents, Washington, D. C."